United States Patent
Rajwat et al.

(10) Patent No.: US 10,607,262 B2
(45) Date of Patent: Mar. 31, 2020

(54) EVALUATING CONTENT ITEMS FOR PRESENTATION TO AN ONLINE SYSTEM USER BASED IN PART ON ONE OR MORE PARAMETERS OF THE USER SPECIFIED BY A THIRD PARTY SYSTEM

(71) Applicant: Facebook, Inc., Menlo Park, CA (US)

(72) Inventors: Paresh Jayant Rajwat, San Jose, CA (US); Asad K. Awan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 812 days.

(21) Appl. No.: 14/808,271

(22) Filed: Jul. 24, 2015

(65) Prior Publication Data
US 2017/0024777 A1    Jan. 26, 2017

(51) Int. Cl.
*G06Q 30/02*    (2012.01)

(52) U.S. Cl.
CPC ............... *G06Q 30/0275* (2013.01)

(58) Field of Classification Search
CPC .................................. G06Q 30/0275
See application file for complete search history.

(56) References Cited

U.S. PATENT DOCUMENTS

2014/0365320 A1* 12/2014 Kanter ................. G06Q 50/01
                                                     705/14.73
2016/0292714 A1* 10/2016 Bhalgat .............. G06Q 30/0242

OTHER PUBLICATIONS

"Real Time Bid Optimization with Smooth Budget Delivery in Online Advertising", by Lee et al. Turn Inc. May 15, 2013 (Year: 2013).*

* cited by examiner

*Primary Examiner* — William A Brandenburg
(74) *Attorney, Agent, or Firm* — Fenwick & West LLP (57) ABSTRACT

An online system receives advertisement ("ad") requests for presentation to its users. An ad request may include one or more values associated with a characteristic of online system users. When an opportunity to present the ad request to a user is identified, the online system obtains the characteristic of the user and determines a value for the user from the ad request based on the obtained characteristic for the user and values associated with the characteristic included in the ad request. The online system generates a score for the ad request based on the determined value for the user, a bid amount in the ad request, and a likelihood of the user interacting with an advertisement in the ad request. Based on the score for the ad request, the online system determines whether to present the advertisement from the ad request to the user.

8 Claims, 2 Drawing Sheets

EVALUATING CONTENT ITEMS FOR PRESENTATION TO AN ONLINE SYSTEM USER BASED IN PART ON ONE OR MORE PARAMETERS OF THE USER SPECIFIED BY A THIRD PARTY SYSTEM

BACKGROUND

This disclosure generally relates to content presented by an online system, and more particularly to evaluating content items for presentation to a user based on a parameter of online system users specified by third party system providing the content items to the online system.

An online system, such as a social networking system, allows its users to connect to and to communicate with other online system users and with objects on the online system. Users may create profiles on an online system that are tied to their identities and include information about the users, such as interests and demographic information. The users may be individuals or entities such as corporations or charities. Because of the increasing popularity of online systems and the significant amount of user-specific information maintained by online systems, an online system allows users to easily communicate information about themselves to other users and share content with other users. For example, an online system provides content items to a user describing actions performed by other users of the online system who are connected to the user.

Additionally, entities (e.g., a business) sponsor presentation of content items ("sponsored content" or "sponsored content items") via an online system to gain public attention for the entity's products or services, or to persuade online system users to take an action regarding the entity's products or services. Many online systems receive compensation from an entity for presenting online users with certain types of sponsored content items provided by the entity. Frequently, online systems charge an entity for each presentation of sponsored content to an online system user (e.g., each "impression" of the sponsored content) or for each interaction with sponsored content by an online system user (e.g., each "conversion"). For example, an online system receives compensation from an entity each time a content item provided by the entity is displayed to a user on the online system or each time a user presented with the content item requests additional information about a product or service described by the content item by interacting with the content item (e.g., requests a product information page by interacting with the content item).

Certain sponsored content items may be sponsored content items presented by an online system may be associated with a landing page that identifies content external to the online system for presentation to an online system user. For example, a sponsored content item may include a network address (e.g., a uniform resource locator) identifying the landing page, and when an online system user interacts with the advertisement via a client device, the client device retrieves content from the network address and presents the content in an application (e.g., a browser). Typically, the sponsored content item includes content representing the content included on a landing page. Thus, users interested in content presented by the sponsored content item interact with the sponsored content item to obtain additional information from the associated landing page about the content presented by the sponsored content item. However, landing pages may provide varying types of information to a user. For example, certain landing pages may provide minimal information describing content from a sponsored content item, while other landing pages may provide information unrelated to content presented by a sponsored content item. When a user interacts with a sponsored content item and is presented with content from a landing page that is of little relevance or interest to the user, the user is less likely to interact with other sponsored content items, which reduces interaction by the user with content presented by the online system and reduces potential revenue to the online system from presenting sponsored content items.

SUMMARY

An online system receives an advertisement request ("ad request") from an advertiser including a bid amount and an advertisement for presentation to a user. The ad request may include a characteristic of one or more online system users specified by the advertiser. The characteristic may be information maintained by the online system, such as demographic information, actions associated with users, connections between users and other users, or other suitable information. Alternatively, the characteristic may be derived from information associated with a user by the online system based on one or more models specified by the advertiser in the ad request or maintained by the online system. For example, a model included in the ad request by an advertiser derives the characteristic from demographic information associated with a user, actions associated with the user, connections between the user and other users, or any other suitable information. One or more adjustment values are associated with values of the characteristic as well. For example, different adjustment values are associated with different ranges of values of the characteristic or a value function generates an adjustment value based on a value of the characteristic.

In some embodiments, the ad request includes an identifier that, when accessed, presents a form to a user for providing information to the advertiser. For example, the ad request includes an identifier of landing page including a form for a user to provide information (e.g., e-mail address, name, demographic information, contact information, etc.). When the user interacts with the advertisement (e.g., selects the advertisements) included in the ad request, the form is retrieved and presented to the user.

When the online system identifies an opportunity to present one or more advertisements to a user, the online system identifies ad requests eligible for presentation to the user, as well as other content items eligible for presentation to the user. An ad request eligible for presentation to the user includes at least a threshold number of targeting criteria satisfied by characteristics of the user, or it may not include targeting criteria. Similarly, a content item eligible for presentation to the user has one or more characteristics, such as an association with another user or object connected to the user via the online system. When the online system identifies an ad request eligible for presentation to the user that includes a characteristic specific by the advertiser, the online system obtains a value of the characteristic for the user from information associated with the user by the online system. For example, the online system retrieves a value of the characteristic for the user from information associated with the user by the online system. As another example, the online system generates a value of the characteristic for the user from information associated with the user by the online system using a model included in the ad request or a model maintained by the online system.

Based on the value of the characteristic for the user, the online system determines an adjustment value for the user from the adjustment values included in the ad request that includes the characteristic. In one embodiment, the ad request including the characteristic associates different adjustment values with different ranges of values of the characteristic, so the online system determines the adjustment value for the user as an adjustment value associated with a range of values of the characteristic including the value of the characteristic for the user. Alternatively, the ad request including the characteristic includes a value function that generates an adjustment value based on the value of the characteristic for the user. The online system generates a score for the ad request based on a likelihood of the user interacting with the advertisement from the ad request, a bid amount included in the ad request, and the adjustment value for the user. Using the score for the ad request, the online system includes the ad request including the characteristic in one or more selection processes that identify content from ad requests and content items eligible for presentation to the user to present to the user. A selection process may rank ad requests based on their associated scores and select ad requests having at least a threshold position in the ranking or select ad requests having at least a threshold score for presentation to the user.

Associating different adjustment values with different ranges of values for the characteristic allows the advertiser to differently modify the scores for ad request for users having different values of the characteristic, which varies likelihoods of users having different values for the characteristics being presented with the advertisement form the ad request. For example, if the characteristic included in the ad request is a credit score, the advertiser includes a model for approximating the credit score in the ad request and a value function that generates an adjustment value based on the approximated credit score and previously generated adjustment values so the generated adjustment values increase the likelihood of the advertisement from the ad request being presented to a distribution of users having approximated credit scores in various ranges. If the ad request includes an identifier that, when accessed, presents a form to a user for providing information to the advertiser, varying likelihoods of the ad request being presented to users having different values for the characteristic allows the advertiser to receive information from users having various values for the characteristic to provide the advertiser with information from a greater diversity of users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
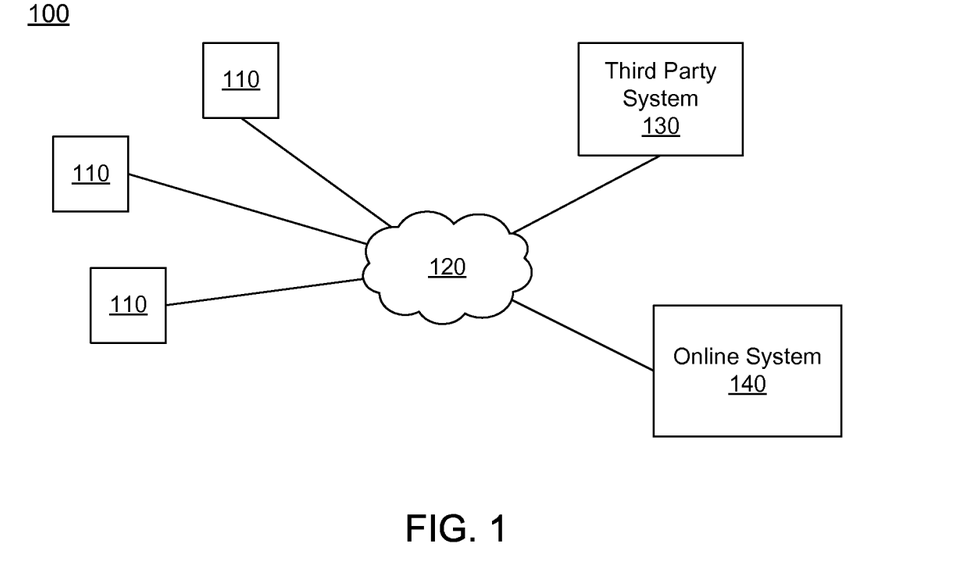
FIG. 1 is a block diagram of a system environment in which an online system operates, in accordance with an embodiment.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisement requests, content, description of actions performed by social networking system users via the third party system 130, or information about an application provided by the third party system 130.

Additionally, a third party system 130 may be associated with a domain differing from a domain associated with the online system 140.

Figure 2:
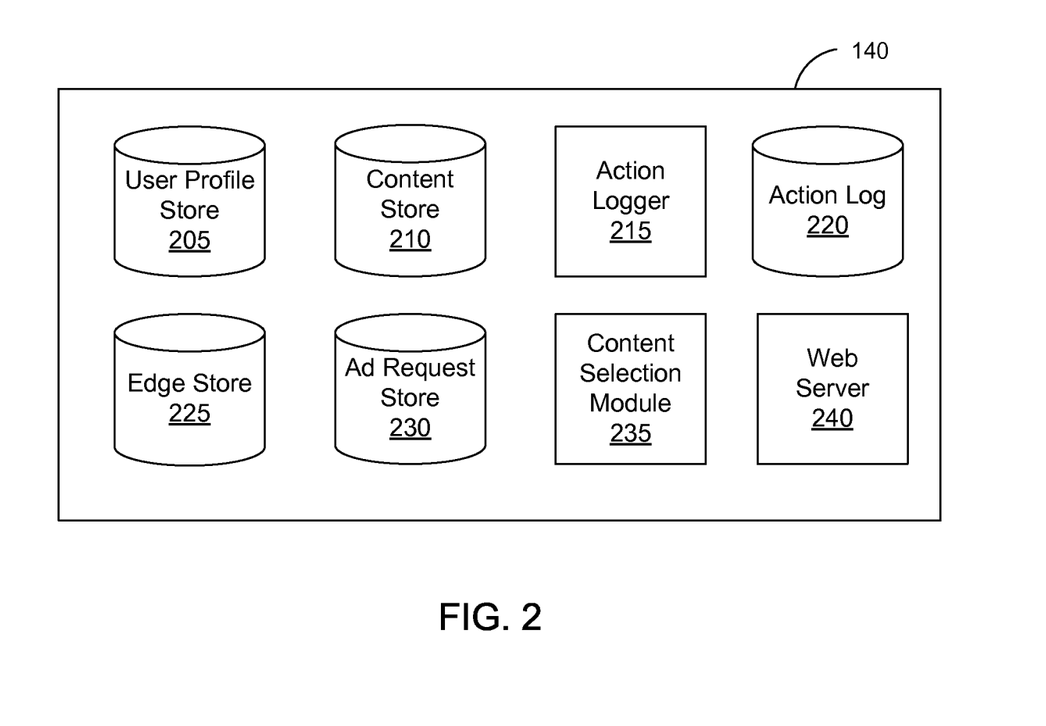
FIG. 2 is a block diagram of an online system, in accordance with an embodiment.

FIG. 2 is an example block diagram of an architecture of the online system 140. The online system 140 shown in FIG. 2 includes a user profile store 205, a content store 210, an action logger 215, an action log 220, an edge store 225, an advertisement request ("ad request") store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689, 969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content, also referred to as an "advertisement," and a bid amount. The advertisement is text, image, audio, video, or any other suitable data presented to a user. In various embodiments, the ad request also includes an identifier of a landing page specifying a network address to which a user is directed when the advertisement is accessed. Hence, the identifier of the landing page identifies a source from which content is retrieved and presented by a client device if a user interacts with the advertisement in the ad request. The source identified by the identifier of the landing page may be associated with a domain different from a domain associated with the online system 140. In some embodiments, an ad request includes an identifier that, when accessed, presents a form to a user for providing information to an advertiser, such as a third party system 130. For example, the ad request includes an identifier of a landing page including a form for a user to provide information (e.g., e-mail address, name, demographic information, contact information, etc.). When the user interacts with the advertisement (e.g., selects the advertisements) included in the ad request, the form is retrieved and presented to the user.

The bid amount is associated with an ad request by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if advertisement content in an ad request is displayed. In some embodiments, the expected value to the online system 140 of presenting the advertisement content may be determined by multiplying the bid amount by a probability of the advertisement content being accessed by a user.

In some embodiments, an ad request includes a characteristic of one or more online system users specified by an advertiser, such as a third party system 130, from which the ad request was received. The characteristic may be information maintained by the online system 140, such as demographic information, actions associated with users, connections between users and other users, or other suitable information. Alternatively, the characteristic may be derived from information associated with a user by the online system 140 based on one or more models specified by the advertiser in the ad request or maintained by the online system 140. For example, a model included in the ad request by an advertiser derives the characteristic from demographic information associated with a user, actions associated with the user, connections between the user and other users, or any other suitable information. One or more adjustment values are associated with values of the characteristic as well. For example, different adjustment values are associated with different ranges of values of the characteristic or a value function generates an adjustment value based on a value of the characteristic. As further described below, an adjustment value associated with a value of a characteristic for a user may be used by the online system 140 when determining whether to present the ad request to a user. Use of an adjustment value when selecting advertisements from ad requests for presentation to a user is further described below in conjunction with FIG. 3.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information (e.g. demographics), edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines scores for various content items based on measures of relevance of the content items to the user determined from characteristics associated with the user by the online system 140 and the user's affinity for different content items. Based on the scores, the content selection module 235 selects content items for presentation to the user. As an additional example, the content selection module 235 selects content items having the highest scores or having at least a threshold score for presentation to the user. Alternatively, the content selection module 235 ranks content items based on their associated scores and selects content items having the highest positions in the ranking or having at least a threshold position in the ranking for presentation to the user.

Content items eligible for presentation to the user may include ad requests or other content items associated with bid amounts. The content selection module 235 uses the bid amounts associated with ad requests when selecting content for presentation to the viewing user. In various embodiments, the content selection module 235 determines a score for various ad requests, or other content items, based at least in part on expected values associated with the ad requests determined from their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. In some embodiments, a score for an ad request is also based on a likelihood of the user interacting with an advertisement in the ad request; for example, a conversion factor is applied to one or more of the expected value of the ad request or to the likelihood of the user interacting with the advertisement in the ad request to convert the likelihood of interaction and the expected value into a common unit of measurement, allowing combination of the expected value and the likelihood of user interacting with the ad request to generate the score for the ad request. As further described below in conjunction with FIG. 3, the content selection module 235 may account for an adjustment value for the user based on information included in an ad request that identifies a characteristic and a value of the characteristic for the user obtained by the content selection module 235 when determining a score for the ad request. The content selection module 235 may rank ad requests based on their associated scores and select ad requests having at least a threshold position in the ranking for presentation to the user. In some embodiments, the content selection module 235 ranks both content items not associated with bid amounts and ad requests in a unified ranking based on scores associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. Additionally, one or more advertisement requests ("ad requests") may be retrieved from the ad request store 230 The retrieved ad requests or content items, are analyzed by the content selection module 235 to identify candidate content items, including ad requests, eligible for presentation to the user. For example, content items associated with users who are not connected to the user or content items associated with users for whom the user has less than a threshold affinity are discarded as candidate content items. Based on various criteria, the content selection module 235 selects one or more of the content items or ad requests identified as candidate content for presentation to the identified user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a newsfeed including a plurality of content items selected for presentation to the user. One or more advertisements from ad requests may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

The web server 240 links the online system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS®, or BlackberryOS.

Figure 3:
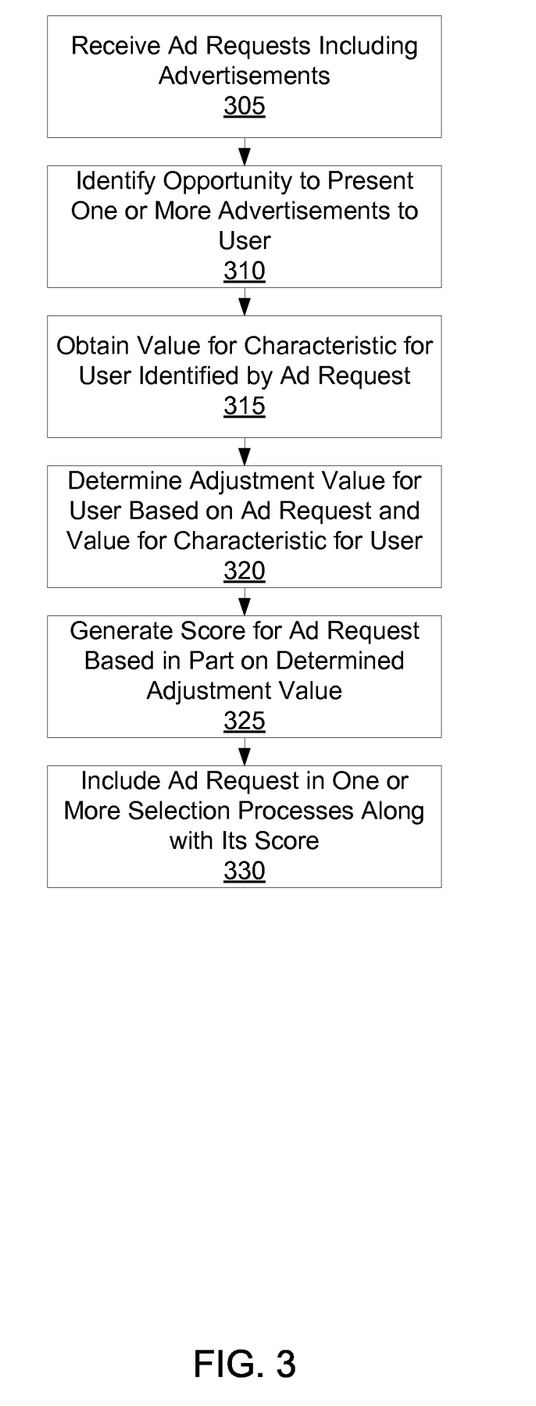
FIG. 3 is a flowchart of a method for modifying a score of an advertisement request based on a characteristic of an online system user specified by an advertiser from which the ad request was received, in accordance with an embodiment.

Accounting for Characteristics of Online System Users Specified by a Third Party System when Scoring an Advertisement Request from the Third Party System for Presentation FIG. 3 is a flowchart of one embodiment of a method for modifying a score of an advertisement request ("ad request") based on a characteristic of an online system user specified by an advertiser, such as a third party system 130, from which the ad request was received. In some embodiments, the method may include different and/or additional steps than those described in conjunction with FIG. 3. Additionally, in some embodiments, the steps of the method may be performed in a different order than the order described in conjunction with FIG. 3.

The online system 140 receives 305 an advertisement request ("ad request") from an advertiser, such as a third party system 130. As described above in conjunction with FIG. 2, the ad request includes a bid amount and an advertisement for presentation to a user. Additionally, an ad request includes a characteristic of users of the online system 140 and one or more adjustment values associated with the characteristic. Any suitable characteristic may be included in the ad request. For example, the characteristic is an attribute of a user maintained by the online system 140 or is derived from information associated with the user and maintained by the online system 140. As an example, the ad request includes a characteristic of a credit score. The ad request may also include different adjustment values that are associated with different values of the characteristic. For example, the advertiser associates different adjustment values with different ranges of values for the characteristic or includes a value function in the ad request that generates an adjustment value based on a value of the characteristic.

In some embodiments, the ad request includes an identifier that, when accessed, presents a form to a user for providing information to the advertiser. For example, the ad request includes an identifier of landing page including a form for a user to provide information (e.g., e-mail address, name, demographic information, contact information, etc.). When the user interacts with the advertisement (e.g., selects the advertisements) included in the ad request, the form is retrieved and presented to the user. In some embodiments, subject to privacy settings associated with the user and enforced by the online system 140, the online system 140 may retrieve certain information associated with the user and include the retrieved information in the form when the form is presented to the user. Populating the form with certain information associated with the user may increase the likelihood of a user providing additional information via the form and communicating the information to the advertiser.

When the online system 140 identifies 310 an opportunity to present one or more advertisements to a user, the online system 140 identifies ad requests eligible for presentation to the user. For example, the online system 140 identifies 310 an opportunity to present one or more advertisements to the user when the online system 140 receives a request to refresh a feed of content presented to the user and identifies ad requests eligible for presentation to the user. As another example, the online system 140 identifies 310 an opportunity to present one or more advertisements to the user when the online system 140 receives a request to present a feed of content to the user and identifies ad requests eligible for presentation to the user. The online system 140 identifies an ad request as eligible for presentation to the user if the ad request includes at least a threshold number of targeting criteria satisfied by characteristics of the user or if the ad request does not include targeting criteria.

If the online system 140 determines the ad request is eligible for presentation to the user, the online system 140 obtains 315 a value of the characteristic for the user from information associated with the user by the online system 140. In some embodiments, the online system 140 retrieves the value of the characteristic from information associated with the user by the online system 140. For example, the characteristic may be demographic information associated with the user (e.g., location, age, educational history, etc.), one or more actions performed by the user, connections between the user and one or more other users or objects maintained by the online system 140, so the online system 140 retrieves a stored value of the corresponding information. Alternatively, the online system 140 determines the value of the characteristic based on information associated with the user. For example, the online system 140 applies one or more models to various information associated with the user by the online system 140 to generate the value of the characteristic. The online system 140 may generate the value of the characteristic based on demographic information associated with the user, actions performed by the user (both via the online system 140 and via one or more third party systems 130), connections between the user and other users or objects, or any other suitable information associated with the user by the online system 140. In some embodiments, the third party system 130 includes one or more models for generating values of characteristic in the ad request. For example, the third party system 130 includes a model in the ad request for generating an approximation of a user's credit score from transactions associated with the user (via the online system 140 or via one or more third party systems 130) and stored in the online system 140 that are accessible via privacy settings specified by the user, location of the user, an employment history of the user, and an educational history of the user Alternatively, the online system 140 maintains or generates one or more models for generating values of the characteristic based on information associated with a user by the online system 140. The models used by the online system 140 may be machine learning models that are modified over time.

Based on the obtained value of the characteristic for the user and the one or more adjustment values associated with the characteristic in the ad request, the online system 140 determines 320 an adjustment value for the user. In one embodiment, the ad request includes different adjustment values associated with different ranges of values of the characteristic, so the online system 140 determines 320 the adjustment value for the user as the adjustment value associated with a range of values of the characteristic that includes the obtained value of the characteristic for the user. Alternatively, the online system 140 applies a value function included in the ad request to the obtained value of the characteristic for the user, and the value function determined 320 the adjustment value for the user based on the obtained value of the characteristic for the user.

Based on the adjustment value determined 320 for the user, the online system 140 generates 325 a score for the ad request based on the bid amount included in the ad request, a likelihood of the user interacting with the advertisement included in the ad request, and the adjustment value for the user. In some embodiments, the online system 140 modifies the bid amount included in the ad request based on the adjustment value for the user and combines the modified bid amount and the likelihood of the user interacting with the advertisement included in the ad request to generate 325 the score for the ad request. Alternatively, the online system 140 combines the bid amount included in the ad request and the likelihood of the user interacting with the advertisement included in the ad request and modifies the combination by the adjustment value to generate 325 the score for the ad request. As described above in conjunction with FIG. 2, in various embodiments, the online system 140 applies a conversion factor to one or more of the bid amount and the likelihood of the user interacting with the advertisement to convert the bid amount and the likelihood of the user interacting with the advertisement to a common unit of measurement to be combined with each other. Hence, the adjustment value for the user increases or decreases the score for the ad request based on the obtained value of the characteristic specified in the ad request for the user. Modifying the score for the ad request based on the value of the characteristic for the user allows the advertiser from which the ad request was received to adjust the likelihood of the advertisement in the ad request being presented to different users based on the values of the characteristic for the different users. For example, associating different adjustment values with different values of the characteristic allows the advertiser from which the ad request was received to modify likelihoods of the advertisement from the ad request being presented to users having different values for the characteristic, allowing the advertiser to specify a distribution of the advertisement from the ad request to users with different values for the characteristic.

Associating different adjustment values with different ranges of values for the characteristic allows the advertiser to differently modify the scores for ad request for users having different values of the characteristic, which varies likelihoods of users having different values for the characteristics being presented with the advertisement form the ad request. For example, if the characteristic included in the ad request is a credit score, the advertiser includes a model for approximating the credit score in the ad request and a value function that generates an adjustment value based on the approximated credit score and previously generated adjustment values so the generated adjustment values increase the likelihood of the advertisement from the ad request being presented to a distribution of users having approximated credit scores in various ranges. If the ad request includes an identifier that, when accessed, presents a form to a user for providing information to the advertiser, varying likelihoods of the ad request being presented to users having different values for the characteristic allows the advertiser to receive information from users having various values for the characteristic to provide the third party system 130 with information from a greater diversity of users.

The online system 140 includes 330 the ad request eligible for presentation to the user along with its score, in one or more selection processes that select content for presentation to the user. A selection process may rank ad requests based on their associated scores and select ad requests having at least a threshold position in the ranking or selects ad requests having at least a threshold score for presentation to the user. The online system 140 includes advertisements from the selected ad requests in content that is communicated to a client device 110 associated with the user for presentation to the user. Using the score for the ad request generated based in part on the adjustment value determined 320 for the user in the selection process allows the online system 140 to account for the value of the characteristic specified in the ad request for the user when selecting content for presentation to the user. Hence, the likelihood of the advertisement from the ad request being presented to the user is modified based on the value of the characteristic specified in the ad request for the user by increasing or decreasing the score for the ad request by the adjustment value determined from the value of the characteristic specified in the ad request for the user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving an advertisement request ("ad request") from a third party system, the ad request including a bid amount, an advertisement, a characteristic for characterizing a user, and a plurality of adjustment values associated with the characteristic, wherein each of the adjustment values corresponds to a different possible value range of the characteristic;
   identifying an opportunity to present one or more advertisements to a user of an online system;
   obtaining a characteristic value of the characteristic by applying one or more machine-learned models to user information associated with the user, the one or more machine-learned models generating the characteristic value of the characteristic from the user information, the user information describing interactions associated with the user and stored in a user profile store;
   determining an adjustment value for the user by detecting which of the plurality of adjustment values received with the ad request corresponds to a determined range associated with the obtained characteristic value for the user;
   determining a likelihood of the user interacting with the advertisement based on an affinity between the user and the advertisement determined from a history of interactions by the user with content of the online system stored to an edge store and connections between users stored to the edge store;
   generating a score for the ad request by combining the bid amount included in the ad request, the likelihood of the user interacting with the advertisement included in the ad request, and the determined adjustment value for the user;
   including the ad request in association with the score in a selection process that identifies content for presentation to the user;
   presenting selected content to the user in a feed of the online system; and
   responsive to receiving an interaction from the user with content in the presented selected content, storing the interaction in association with the content in the user profile store.

2. The method of claim 1, wherein the ad request includes an identifier that, when accessed, presents a form for providing information to the third party system to the user.

3. The method of claim 1, wherein generating the score for the ad request based at least in part on the bid amount included in the ad request, the likelihood of the user interacting with the advertisement included in the ad request, and the determined adjustment value for the user comprises:
   modifying the bid amount included in the ad request by the determined adjustment value for the user.

4. The method of claim 1, determining the adjustment value comprises deriving the adjustment value using a value function applied to the obtained characteristic value of the characteristic.

5. A computer program product comprising a non-transitory computer-readable storage medium having instructions encoded thereon that, when executed by a processor, cause the processor to:
   receive an advertisement request ("ad request") from a third party system, the ad request including a bid amount, an advertisement, a characteristic for characterizing a user, and a plurality of adjustment values associated with the characteristic, wherein each of the adjustment values corresponds to a different possible value range of the characteristic;
   identify an opportunity to present one or more advertisements to a user of an online system;
   obtain a characteristic value of the characteristic by applying one or more machine-learned models to user information associated with the user, the one or more machine-learned models generating the characteristic value of the characteristic from the user information, the user information describing interactions associated with the user and stored in a user profile store;
   determine an adjustment value for the user by detecting which of the plurality of adjustment values received with the ad request corresponds to a determined range associated with the obtained characteristic value for the user;
   determine a likelihood of the user interacting with the advertisement based on an affinity between the user and the advertisement determined from a history of interactions by the user with content of the online systems stored to an edge store and connections between users stored to the edge store;
   generate a score for the ad request by combining the bid amount included in the ad request, the likelihood of the user interacting with the advertisement included in the ad request, and the determined adjustment value for the user;
   include the ad request in association with the score in a selection process that identifies content for presentation to the user;
   present selected content to the user in a feed of the online system; and
   responsive to receiving an interaction from the user with content in the presented selected content, store the interaction in association with the content in the user profile store.

6. The computer program product of claim 5, wherein the ad request includes an identifier that, when accessed, presents a form for providing information to the third party system to the user.

7. The computer program product of claim 5, wherein generate the score for the ad request based at least in part on the bid amount included in the ad request, the likelihood of the user interacting with the advertisement included in the ad request, and the determined adjustment value for the user comprises:
   modify the bid amount included in the ad request by the determined adjustment value for the user.

8. The computer program product of claim 5, determining the adjustment value comprises deriving the adjustment value using a value function applied to the obtained characteristic value of the characteristic.

* * * * *